United States Patent [19]

Kuhtik

[11] Patent Number: 4,854,049

[45] Date of Patent: Aug. 8, 1989

[54] MAGNETIC CROPPER

[76] Inventor: John N. Kuhtik, 735 Garden St., Hoboken, N.J. 07030

[21] Appl. No.: 126,117

[22] Filed: Nov. 27, 1987

[51] Int. Cl.$^4$ ............................................. G03D 15/00
[52] U.S. Cl. .................................. 33/464; 33/DIG. 9; 33/DIG. 1; 33/427; 355/126
[58] Field of Search ..... 33/DIG. 9, DIG. 1, 562–566, 33/464, 427, 1 D, 1 K, 430; 355/125, 126, 133, 74; 40/352, 353; 116/235, 240; 403/DIG. 1; 269/8

[56] References Cited

U.S. PATENT DOCUMENTS

| | | | |
|---|---|---|---|
| 1,245,821 | 11/1917 | Thompson | 33/DIG. 1 |
| 1,642,232 | 9/1927 | Edwards | 33/DIG. 1 |
| 2,626,467 | 1/1953 | Abbott | 33/DIG. 9 |
| 2,822,736 | 2/1958 | Padgett | 33/DIG. 1 |
| 3,198,047 | 8/1965 | Munz | 269/8 |
| 3,561,748 | 2/1971 | Schefers | 269/8 |
| 3,878,615 | 4/1975 | Peterson | 33/DIG. 9 |
| 4,274,459 | 6/1981 | Galajda | 33/563 |
| 4,564,414 | 1/1986 | Houssian et al. | 269/8 |
| 4,599,798 | 7/1986 | Steele | 33/566 |
| 4,638,569 | 1/1987 | Dove | 33/DIG. 9 |
| 4,672,747 | 6/1987 | Turner | 33/DIG. 9 |

FOREIGN PATENT DOCUMENTS

| | | | |
|---|---|---|---|
| 2701809 | 7/1978 | Fed. Rep. of Germany | 355/74 |
| 510752 | 7/1955 | Italy | 403/DIG. 1 |
| 667716 | 6/1979 | U.S.S.R. | 403/DIG. 1 |

Primary Examiner—William A. Cuchlinski, Jr.
Assistant Examiner—Patrick R. Scanlon
Attorney, Agent, or Firm—Shenier & O'Connor

[57] ABSTRACT

A photographic cropper comprises a pair of opposable right-angle portions, each of which contains alternating transversely spaced strips of oppositely magnetized material extending parallel to edges of that portion. The right-angle portions are continuously adjustable relative to each other in the direction of the strips and are relatively adjustable in a direction perpendicular to the strips in equally spaced steps corresponding to the spacing between similarly magnetized strips of each portion.

10 Claims, 1 Drawing Sheet

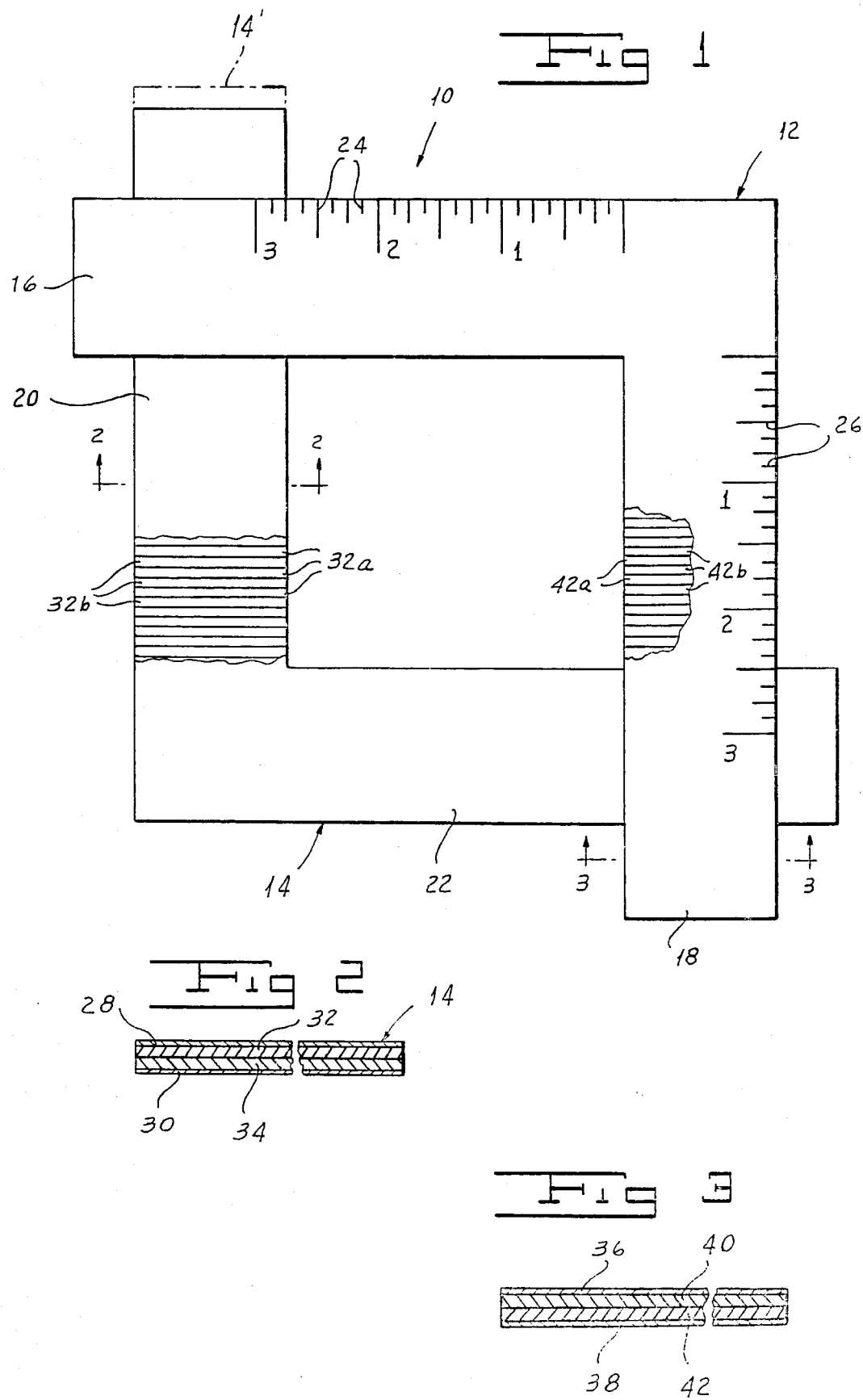

MAGNETIC CROPPER

BACKGROUND OF THE INVENTION

This application relates to an assembly having two relatively movable members and, in particular, to a cropper for use by photographers and other persons in the graphic arts for viewing art work in a specified frame or format.

Croppers for demarcating the desired rectangular portion of an image are well known in the art. Generally, such croppers consist of a pair of opposing, relatively movable right-angle portions arranged together to form a rectangle enclosing the desired image area. Obviously, the right-angle portions of the cropper must be freely movable to provide the desired adjustment of image area. On the other hand, it is desirable that the two right-angle portions be maintained in an assembled position as well as in proper parallelism with each other. It is known in the art to form one cropper element of a permanent magnetic material and the other of a magnetizable material so that the two portions are held together magnetically. Such an arrangement, however, does not maintain the portions parallel.

SUMMARY OF THE INVENTION

One object of my invention is to provide a photographic cropper which maintains the adjustable elements in an assembled relation with one another.

Another object of my invention is to provide a photographic cropper in which the adjustable portions are maintained parallel.

A further object of my invention is to provide a photographic cropper which is simple and inexpensive.

Other and further objects will be apparent from the following description.

In general, my invention contemplates an assembly in which a pair of preferably rigid relatively movable opposable members, preferably right-angle portions cooperating with each other to enclose a rectangle of variable size, have corresponding transversely spaced strips of magnetized material to permit continuous relative adjustment of the members in the direction of the strips while permitting relative adjustment of the members transversely of said strips in steps corresponding to the spacing therebetween. Preferably, the strips are parallel to the edges of the members. Further, each member preferably comprises a first plurality of such strips magnetized in a predetermined direction alternating with a second plurality of such strips magnetized in the opposite direction.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 1 is a top plan of a photographic copier incorporating my invention, with parts broken away.

FIG. 2 is an enlarged fragmentary section of the lower right-angle portion of the cropper of FIG. 1, taken along line 2—2 thereof.

FIG. 3 is a fragmentary section of the upper right angle-portion of the cropper of FIG. 1, taken along line 3—3 thereof.

DESCRIPTION OF THE PREFERRED EMBODIMENT

Referring now to FIG. 1, my cropper, indicated generally by the reference numeral 10, includes an upper right-angle portion indicated generally by the reference numeral 12 and a lower right-angle portion indicated generally by the reference numeral 14. Upper portion 12 comprises a leg 16 extending to the left and a leg 18 extending downwardly from leg 16. Similarly, right-angle portion 14 comprises an upwardly extending leg 20 and a leg 22 extending rightwardly from leg 20. In the embodiment shown, right-angle portion 12 bears respective gradations 24 and 26 along legs 16 and 18 marking the distance along those legs from the inner corner formed by legs 16 and 18. As shown in FIG. 1, right-angle portion 12 is intended to be placed over right-angle portion 14.

Referring now to FIG. 2, right-angle portion 14 comprises an upper layer 32 of flexible magnetic material and a lower layer 34 of a suitable nonmagnetic material such as aluminum. Respective coatings of paint 28 and 30 are applied to upper and lower layers 32 and 34. In a similar manner, referring now to FIG. 3, upper right-angle portion 12 comprises a lower layer 42 of magnetic material and an upper support layer 40 of aluminum or the like. Respective coatings of paint 36 and 38 are applied to upper and lower layers 40 and 42.

Referring again to FIG. 1, magnetic layer 32 comprises a plurality of parallel horizontal strips or domains 32a and 32b. (The horizontal lines in FIG. 1 represent divisions between adjacent domains 32a and 32b rather than visible dividing lines.) In the embodiment shown, each strip 32a or 32b has a width of 0.08 inch (i.e., 12.5 strips to the inch) so that adjacent strips 32a and 32b of the same type are spaced at intervals of 0.16 inch. Strips 32a and 32b are magnetized in opposite directions from each other so that the north poles of strip 32a for instance are located at the top as viewed in FIG. 1, while the north poles of strip 32b are located at the bottom as viewed in the same FIG. In a similar manner, magnetic layer 42 of right-angle portion 12 comprises a plurality of spaced parallel strips or domains 42a and 42b, each of which extends horizontally in a manner corresponding to that of strips 32a and 32b. Strips 42a and 42b are similarly arranged in alternating fashion, with strips 42a having their north poles arranged at the bottom as viewed in FIG. 1 and strips 42b having their north poles arranged at the top as viewed in the same FIG. Strips 42a and 42b have the same 0.08 inch width as strips 32a and 32b.

Strips 32a and 32b are so located relative to strips 42a and 42b that, when legs 16 and 22 are arranged parallel to each other, the strips 42a and 42b of portion 12 lie directly opposite strips 32a and 32b, respectively, of portion 14, in the regions of overlap of legs 16 and 20 and legs 18 and 22. Since the poles of such aligned strips are oppositely directed, portions 12 and 14 will exert an attractive force on each other, forming in effect a detent in which strips 42a are aligned with strips 32a. Portions 12 and 14 may be continuously adjusted horizontally relative to each other as viewed in FIG. 1, since this leaves the vertical alignment of the strips undisturbed. On the other hand, portions 12 and 14 are relatively adjustable vertically only in such increments, such as that indicated by position 14' in FIG. 1, as to leave strips 42a of portion 12 aligned with strips 32a of portion 14. Since the strips 32a and 42a are each spaced 0.16 inch apart, this results in effect in a series of magnetically defined detents spaced 0.16 inch apart vertically. If desired, rather than extending parallel to legs 16 to 22, strips 32a, 32b and 42a, 42b may extend obliquely so as to allow continuously variable adjustment along a diagonal to the legs.

It will be seen that I have accomplished the objects of my invention. My cropper holds the two right-angle portions together in correct parallelism with each other, while at the same time permitting their relative adjustment in either of two dimensions.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An assembly including in combination a pair of relatively movable opposable members, each of said members having a plurality of parallel strips of similarly magnetized material that are regularly spaced from one another perpendicularly of their lengths, strips of one of said members registering with strips of the other of said members at predetermined relative displacements of said members to permit continuous relative adjustment of said members parallel to said strips while effecting relative adjustment of said members perpendicularly of said strips in steps corresponding to said displacements.

2. An assembly as in claim 1 in which said members cooperate with each other to enclose a rectangle of variable size.

3. An assembly as in claim 2 in which said strips are parallel to sides of said rectangle.

4. An assembly as in claim 1 in which each of said members has a pair of mutually perpendicular adjacent inner edges.

5. An assembly as in claim 4 in which said strips of each of said members are parallel to one of said edges of said member.

6. Apparatus as in claim 1 in which said strips of each of said members comprise a first plurality of strips magnetized in a predetermined direction, each of said members also having a second plurality of strips magnetized in the opposite direction alternating with said first plurality of strips.

7. An assembly as in claim 1 in which said members cooperate with each other to form a rectangle of variable size with the strips of one of said members parallel to the strips of the other of said members.

8. An assembly as in claim 1 in which the transverse spacing between the strips of one of said members is equal to the transverse spacing between the strips of the other of said members.

9. A member having a pair of mutually perpendicular adjacent inner edges and having a plurality of strips of similarly magnetized material parallel to one of said edges that are regularly spaced from one another perpendicularly of their lengths to permit continuous adjustment of said member relative to a similar member parallel to said strips while effecting adjustment of said member relative to a similar member perpendicularly of said strips in steps corresponding to the spacing therebetween.

10. Apparatus as in claim 9 in which said strips comprise a first plurality of strips magnetized in a predetermined direction, said member also having a second plurality of strips magnetized in the opposite direction alternating with said first plurality of strips.

* * * * *